Figure 1:
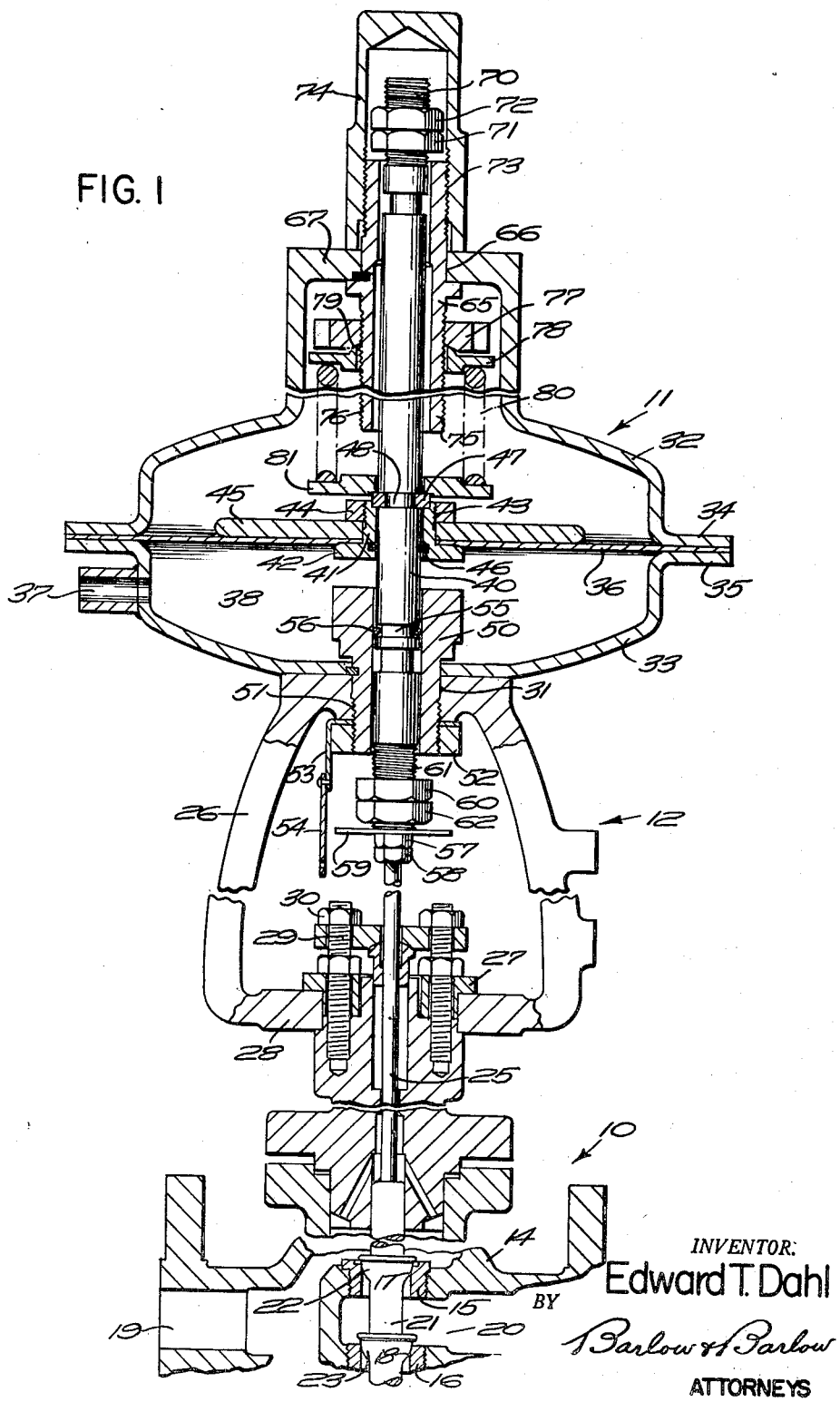

June 30, 1953  E. T. DAHL  2,643,667
REVERSIBLE APPLICATION OF POWER TO MOTOR-OPERATED VALVE
Filed Sept. 22, 1951  2 Sheets-Sheet 1

INVENTOR:
Edward T. Dahl
BY
Barlow & Barlow
ATTORNEYS

June 30, 1953     E. T. DAHL     2,643,667
REVERSIBLE APPLICATION OF POWER TO MOTOR-OPERATED VALVE
Filed Sept. 22, 1951     2 Sheets—Sheet 2

FIG. 2

INVENTOR.
Edward T. Dahl
BY
Barlow & Barlow
ATTORNEYS

Patented June 30, 1953

2,643,667

UNITED STATES PATENT OFFICE 2,643,667

REVERSIBLE APPLICATION OF POWER TO MOTOR-OPERATED VALVE

Edward T. Dahl, Warwick Neck, R. I., assignor, by mesne assignments, to Reconstruction Finance Corporation, Boston, Mass., a corporation of the United States Application September 22, 1951, Serial No. 247,784

4 Claims. (Cl. 137—270)

This invention relates to a motor-operated valve of the type in which some power such as fluid is utilized for the movement of the valve in one direction and a spring is utilized for the operation of the valve in the other direction.

Heretofore, it has been found desirable in the use of such a valve to have a spring close the valve and some power means to open the valve for one purpose; whereas, with the same valve on some other work, it would be desirable to have the spring open the valve and some power to close the valve. This has usually been accomplished by valves of different design.

One of the objects of this invention is to provide a motor for operating a valve which is so arranged that if power operation of the valve in one direction is required, the motor will be placed with one end toward the valve plug; whereas, if the valve is desired to be operated in the other direction by power, it will be merely necessary to reverse the motor and apply the other end toward the valve plug, the single structure serving for both purposes and it being merely a matter of selection of assembly as to the direction in which the motor operates.

With this and other objects in view, the invention consists of certain novel features of construction, as will be more fully described and particularly pointed out in the appended claims.

In the accompanying drawings:

Figure 1 is a sectional view showing the valve structure, the motor, and the intermediate structure of the assembly; and Figure 2 is a view similar to Figure 1 showing the intermediate structure in full and the motor arranged with its ends opposite to the arrangement shown in Figure 1 for a reverse power action.

In proceeding with this invention, I provide a motor within a casing which will have a shaft extending through the casing in opposite directions. The opposite ends of the casing are so arranged that either may be located on a mounting structure of the intermediate part of the mechanism between the valve body and the motor and either end of the shaft which protrudes from the motor casing may be connected to the plug stem. The motor will be either piston or diaphragm operated with the diaphragm or piston connected to the shaft of the motor for operation as a result of an expansion chamber type of mechanism. A spring will force the pressure separator in one direction while some fluid, such as air or liquid, will be used in the expansion chamber for forcing the shaft in the other direction.

With reference to the drawings, 10 designates generally the valve body, 11 the motor, and 12 the intermediate structure for connecting the valve plug stem and the motor.

The valve is shown as a conventional valve having a body 14 in which there are bushings 15 and 16 providing valve seats 17 and 18 between the inlet port 19 and the chamber 20 connected to the exhaust port. The valve plug 21 is provided with surfaces 22 and 23 to engage the seats 17 and 18 to close the passage from the inlet port 19 to the exhaust port. A valve stem 25 extends through the body for transmitting motion to the valve plug for opening or closing the same. Suitable packings are about the stem for preventing the escape of the fluid which the valve plug controls.

The intermediate structure 12 comprises a yoke 26 which is secured to the valve body by the flanged member 27 binding the lower portion 28 of the yoke to the valve body by means of the threaded members 29 and nuts 30. There is an opening 31 at the upper end of this intermediate mechanism which serves as a support for the motor 11 by which the motor is attached in position.

The motor 11 comprises a casing having one part 32 and another part 33 each flanged as at 34 and 35 with a diaphragm 36 located between the parts and held by the clamping of the flanges 34 and 35 together. This diaphragm is of a flexible character so that it may yield in response to fluid pressure which may be introduced through the port 37 into the chamber 38 provided between the diaphragm 36 and the casing part 33. A shaft 40 is secured to the diaphragm 36 by means of a sleeve 41 extending along the shaft and through the diaphragm and flanged as at 42 to engage a larger surface of the diaphragm. This sleeve is threaded as at 43 and has a nut 44 threaded onto this portion 43 which engages a button or washer 45 to bind against the diaphragm and hold the sleeve firmly secured thereto. An O ring at 46 serves as a seal between the shaft and the sleeve to prevent the escape of any fluid from chamber 38. A collar 47 is set into a recess 48 in the shaft so that pressure tending to slide the sleeve 41 along the shaft would cause the sleeve to abut this collar 47 and prevent sliding movement.

A bushing 50 extends through the casing part 33 and is rigidly secured therein, being threaded as at 51 and of a size to pass through the opening 31 in the intermediate portion or yoke 12. A nut 52 engages the threads 51 to hold this bushing assembled with the yoke. A bracket 53 may be positioned beneath the nut and extend downwardly as at 54 to provide a scale. The shaft 40 has a bore at each of its opposite ends into which the threaded end of the stem 25 may alternatively engage and be held by the nut 57 and check nut 58. The nuts also serve to hold the pointer 59 between the nut 57 and the end of the shaft which will serve to indicate the position of the valve in its body. A nut 60 threadingly engages the portion 61 of the shaft and may be located at any position therealong and held by check nut 62 so as to limit the movement of the shaft in an upward direction by the nut engaging the end of the bushing 50.

A bushing 65 is secured in opening 66 in the end wall 67 of the casing part 32 and projects inwardly and outwardly of this casing part. The shaft 40 extends through this bushing and is threaded at 70 providing a duplicate of the threads 61 while there is a threaded bore in this end of the shaft which may receive the end of the stem 25 to be held therein when the shaft is in the inverted position shown in Figure 2. A nut 71 on the threads 70 will engage the end of the bushing 65 and limit downward movement. This nut 71 is held in place by check nut 72. The outer portion of the bushing 65 is threaded as at 73 and when in the position shown in Figure 1 will have a cap 74 engaging these threads and covering the end of the shaft, as shown in Figure 1. However, when the unit 11 is in the inverted position, as shown in Figure 2, the bushing 65 will project through the opening 31 in the yoke 26 and be engaged by the nut 52, the threads 51 and 73 being duplicates. Likewise, when the motor is inverted, the cap 74 may engage the threads 51 of the bushing 50.

The bushing 65 is provided with an internally extending portion 75 which is threaded as at 76, upon which threads there is a nut 77 which engages an abutment plate 78 by reason of a partially spherical recess in the nut and protuberance on the plate as at 79 and this abutment plate serves as an end engagement for a spring 80 which presses between this plate and a second abutment plate 81 which engages the collar 47 of the shaft 40. Thus, this spring serves to urge the shaft 40 downwardly, as shown in Figure 1, or upwardly, as shown in Figure 2.

If it is desired that the spring pressure move the valve plug to closed position, the motor will be arranged as shown in Figure 1 with the expansion chamber 38 below the diaphragm and the spring above the diaphragm so that should there be any failure in the fluid pressure, the spring will force the valve closed. This is desirable where the valve is used for supply steam. However, in certain cooling systems it is desired that should there be any failure in pressure that the valve would fail open and under such conditions, the fluid motor 11 will be inverted and in the position shown in Figure 2 where the spring 80 urges the shaft upwardly and the chamber 38 is above the diaphragm so that when pressure is applied the shaft 40 will be forced downwardly to close the valve. Thus, should the fluid pressure fail, the spring would force the shaft upwardly and open the plug.

From the above, it will appear that the motor is so arranged that actuation may be chosen either for opening or for closing the valve as the same may be desired, and yet the same parts may be used for either operation. I have referred to the diaphragm 36 as a pressure separator as it will be readily apparent that I might use a piston instead of a diaphragm for the expansion chamber.

I claim:

1. A motor-operated valve comprising a body, a plug axially movable in said body to and from a seat, a support on said body for a motor, a motor having a casing, a shaft extending through said casing with its opposite ends projecting therefrom, said shaft being spring loaded in one direction with reference to said casing, means to axially move said shaft against the spring loading, duplicate means at the ends of said casing through which said shaft extends to selectively engage said support and means to connect the shaft at the selected end to said plug.

2. A motor-operated valve comprising a body, a plug axially movable in said body to and from a seat, a support on said body for a motor, a motor having a casing, a shaft extending through said casing with its opposite ends projecting therefrom, a movable pressure separator in said casing secured to said shaft and providing an expansible chamber on one side of the separator, a spring on the other side of the separator engaging the separator and said casing, a conduit to said chamber, duplicate means at the ends of said casing through which said shaft extends to selectively engage said support and means to connect the shaft at the selected end to said plug.

3. A motor-operated valve as in claim 2 wherein said separator is a diaphragm.

4. A motor-operated valve as in claim 1 wherein said support comprises an opening and said duplicate means comprises a threaded shouldered bushing to extend through said opening and be secured therein by a nut engaging the threads of said bushing and a portion of the support about said opening.

EDWARD T. DAHL.

References Cited in the file of this patent

UNITED STATES PATENTS

| Number | Name | Date |
|---|---|---|
| 2,363,944 | Carrier | Nov. 28, 1944 |